US011921470B2

(12) United States Patent
Kojima et al.

(10) Patent No.: US 11,921,470 B2
(45) **Date of Patent: *Mar. 5, 2024**

(54) DEVICE WITH BUTTONS AND ELECTRONIC TIMEPIECE

(71) Applicant: CASIO COMPUTER CO., LTD., Tokyo (JP)

(72) Inventors: Kazuyasu Kojima, Kokubunji (JP); Takafumi Suzuki, Saitama (JP); Rei Morisawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,456

(22) Filed: Oct. 20, 2022

(65) Prior Publication Data

US 2023/0045042 A1 Feb. 9, 2023

Related U.S. Application Data

(63) Continuation of application No. 16/356,973, filed on Mar. 18, 2019, now Pat. No. 11,507,029.

(30) Foreign Application Priority Data

Mar. 23, 2018 (JP) ................................ 2018-056435

(51) Int. Cl.
*G04G 21/08* (2010.01)
*G04G 9/12* (2006.01)

(52) U.S. Cl.
CPC ............ *G04G 21/08* (2013.01); *G04G 9/126* (2013.01)

(58) Field of Classification Search
CPC ....... H01H 2300/024; H01H 2223/034; H01H 2223/036; H01H 2223/044; G04G 9/126; G04G 17/08; G04G 21/08; G04G 21/00; G04C 3/001; G04C 3/008; G05G 1/02; G05G 1/025; G05G 25/04
USPC .......... 200/43.01, 43.11, 43.13, 43.16, 43.18
See application file for complete search history.

(56) References Cited

U.S. PATENT DOCUMENTS

| | | | | |
|---|---|---|---|---|
| 4,368,369 A * | 1/1983 | Matsumoto | H01H 13/785 968/899 |
| 5,378,862 A | 1/1995 | Tasaka et al. | |
| 5,734,625 A * | 3/1998 | Kondo | A61B 5/6838 368/10 |

(Continued)

FOREIGN PATENT DOCUMENTS

| | | |
|---|---|---|
| CN | 105190450 A | 12/2015 |
| CN | 205229685 U | 5/2016 |

(Continued)

OTHER PUBLICATIONS

Chinese Office Action dated Aug. 3, 2020, for the corresponding Chinese Patent Application No. 201910217059.9, 21 pages. (With English Machine Translation).

(Continued)

*Primary Examiner* — Edwin A. Leon
(74) *Attorney, Agent, or Firm* — Seed IP Law Group LLP

(57) ABSTRACT

A device with buttons includes: a display unit that is configured to perform predetermined display; and a plurality of buttons that are positioned on a lower side of the display unit. An area of a button to be most frequently used is the largest among areas of the plurality of buttons.

15 Claims, 9 Drawing Sheets

(56) References Cited

U.S. PATENT DOCUMENTS

| | | | | |
|---|---|---|---|---|
| 6,249,487 | B1 | 6/2001 | Yano et al. | |
| 7,466,235 | B1 | 12/2008 | Kolb et al. | |
| 8,206,028 | B2 * | 6/2012 | Okuda | G04B 19/283 368/295 |
| 11,507,029 | B2 * | 11/2022 | Kojima | G04G 9/126 |
| 2003/0231552 | A1 | 12/2003 | Markart | |
| 2006/0187759 | A1 | 8/2006 | Fujiwara | |
| 2016/0026156 | A1 | 1/2016 | Jackson et al. | |

FOREIGN PATENT DOCUMENTS

| | | | |
|---|---|---|---|
| JP | 51-104377 | A | 9/1976 |
| JP | S55-128183 | A | 10/1980 |
| JP | S62-5293 | A | 1/1987 |
| JP | 62-190621 | A | 8/1987 |
| JP | 5-15437 | A | 1/1993 |
| JP | 10-94183 | A | 4/1998 |
| JP | H10-199361 | A | 7/1998 |
| JP | 10-225378 | A | 8/1998 |
| JP | 2000-56045 | A | 2/2000 |
| JP | 2001-221873 | A | 8/2001 |
| JP | 2001-236096 | A | 8/2001 |
| JP | 2003-172787 | A | 6/2003 |
| JP | 2004-081745 | A | 3/2004 |
| JP | 2004-264187 | A | 9/2004 |
| JP | 2005-312585 | A | 11/2005 |
| JP | 2014-25762 | A | 2/2014 |

OTHER PUBLICATIONS

Japanese Notice of Reasons for Refusal dated Oct. 27, 2020, for the corresponding Japanese Patent Application No. 2018-056435, 14 pages. (With English Machine Translation).

Japanese Notice of Reasons for Refusal dated Jan. 5, 2021, for the corresponding Japanese Patent Application No. 2018-056435, 12 pages. (With English Machine Translation).

Japanese Reasons for Refusal dated Jan. 9, 2024, for Japanese Application No. 2022-173097, 13 pages (with English Translation).

* cited by examiner

DEVICE WITH BUTTONS AND ELECTRONIC TIMEPIECE

CROSS-REFERENCE TO RELATED APPLICATIONS

This application is a continuation of U.S. patent application Ser. No. 16/356,973, filed on Mar. 18, 2019, which claims priority under 35 USC 119 from Japanese Patent Application No. 2018-056435 filed on Mar. 23, 2018, the contents of which are incorporated herein by reference.

BACKGROUND

1. Technical Field

The technical field relates to a device with buttons and an electronic timepiece.

2. Description of the Related Art

As a device with buttons according to the related art, there is a known device which has a display unit provided at the front of the main body of the device and having push buttons to be frequently used, arranged on the upper and lower sides of the display unit, respectively, (for example, Japanese Patent Application Laid-Open No. 2004-81745 which is a patent literature), like watch type information devices.

In this device, a start/stop function and a lap/reset function for a stopwatch function are assigned to the buttons provided on the upper and lower sides (also referred to as at the 12 o'clock position and the 6 o'clock position) of the display unit provided at the front.

While running, the user performs desired time measurement by operating the lap/reset button.

However, while running, sometimes, the user may push buttons on the basis of the sense of touch, without seeing the positions of the buttons. In such a case, the user may push a wrong button touched by a finger and easy to be pushed. For example, even if the user wants to measure a lap time, the user may push the start/stop button provided at such a position that the start/stop button can be easily pushed, like on the lower side of the display unit, thereby stopping the measurement.

Meanwhile, in the case where a plurality of buttons is provided collectively at such a position on the lower side of the display unit that the buttons can be easily pushed, since the size of each button is smaller. Therefore, the possibility that the user will push a wrong neighboring button increases.

SUMMARY

A device with buttons and an electronic timepiece are disclosed herein.

A device with buttons includes: a display unit that is configured to perform predetermined display; and a plurality of buttons that are positioned on a lower side of the display unit. An area of a button to be most frequently used is the largest among areas of the plurality of buttons.

DETAILED DESCRIPTION

Figure 1:
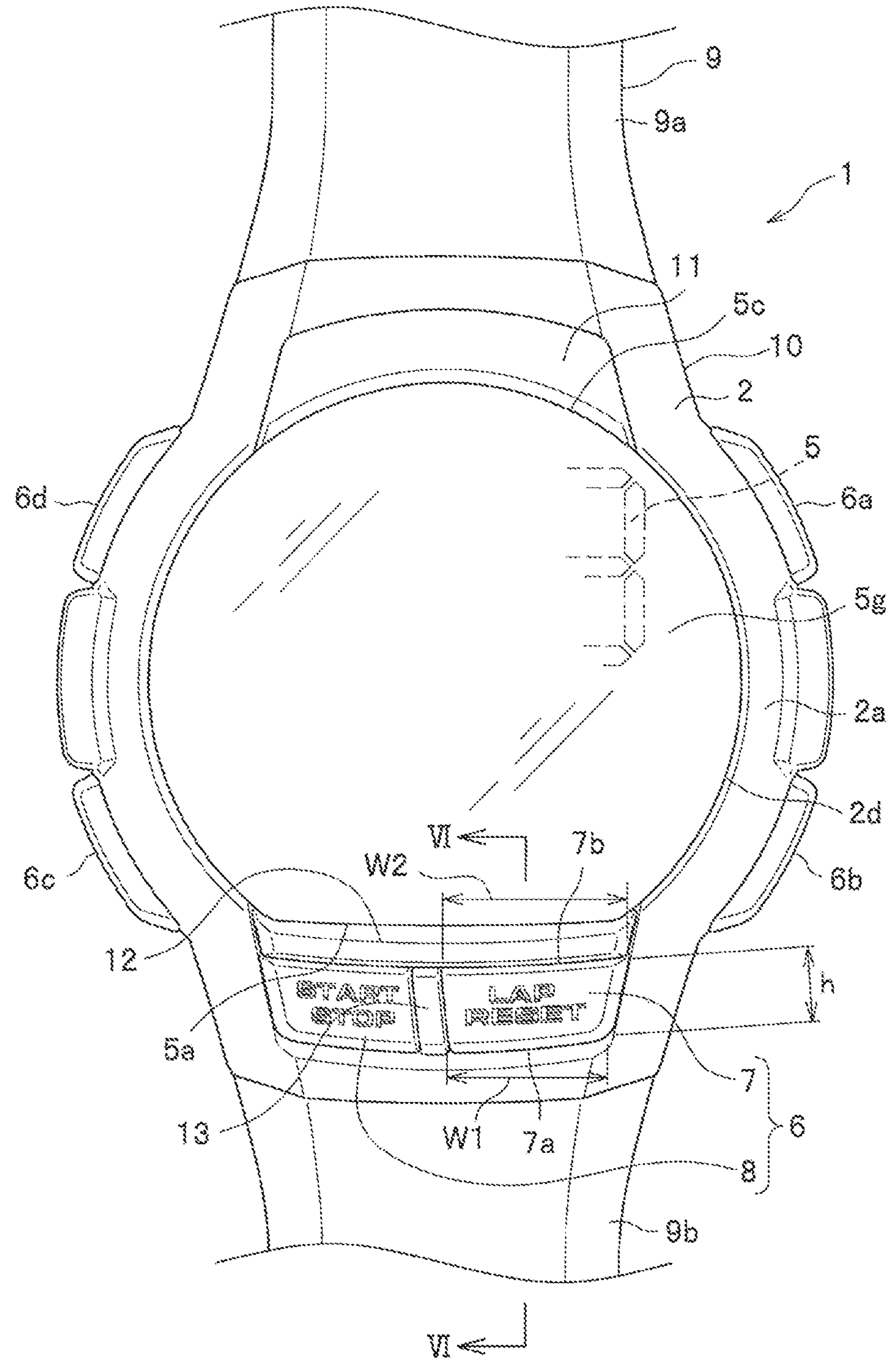
FIG. 1 is a front view illustrating an electronic timepiece as a device with buttons according to a first embodiment as the electronic timepiece is seen from a direction shown by an arrow I in FIG. 2.

Hereinafter, embodiments will be described while appropriately referring to the drawings. Identical components are denoted by the same reference symbols, and repetitive descriptions thereof will not be made. Unless otherwise stated, when directions are referred to, they are basically referred to on the basis of the front, rear, left, right, top, and bottom of each device as seen from the user. Also, the 3 o'clock position, the 6 o'clock position, the 9 o'clock position, and the 12 o'clock position are synonymous with the direction to the right edge, the direction to the lower edge, the direction to the left edge, and the direction of the upper edge when the user faces to a display unit. Further, the front-rear direction is synonymous with the height direction.

First Embodiment

FIG. 1 to FIG. 7 are views illustrating an electronic timepiece 1 of a first embodiment which is a device with buttons wearable on a wrist.

First, with reference to FIG. 1, the configuration will be described. The electronic timepiece 1 of the first embodiment is a watch type electronic timepiece using a digital system. However, unless otherwise stated, the electronic timepiece 1 may be a watch type electronic timepiece using a pointer system (an analog system), or may have both systems.

The electronic timepiece 1 includes a main device body 10 (namely, a main body of the electronic timepiece 1) which can be held on a wrist with belt parts 9, a case 2 of the main device body 10, and a board 3 (see FIG. 5 and FIG. 6) which is disposed inside the case 2.

Figure 2:
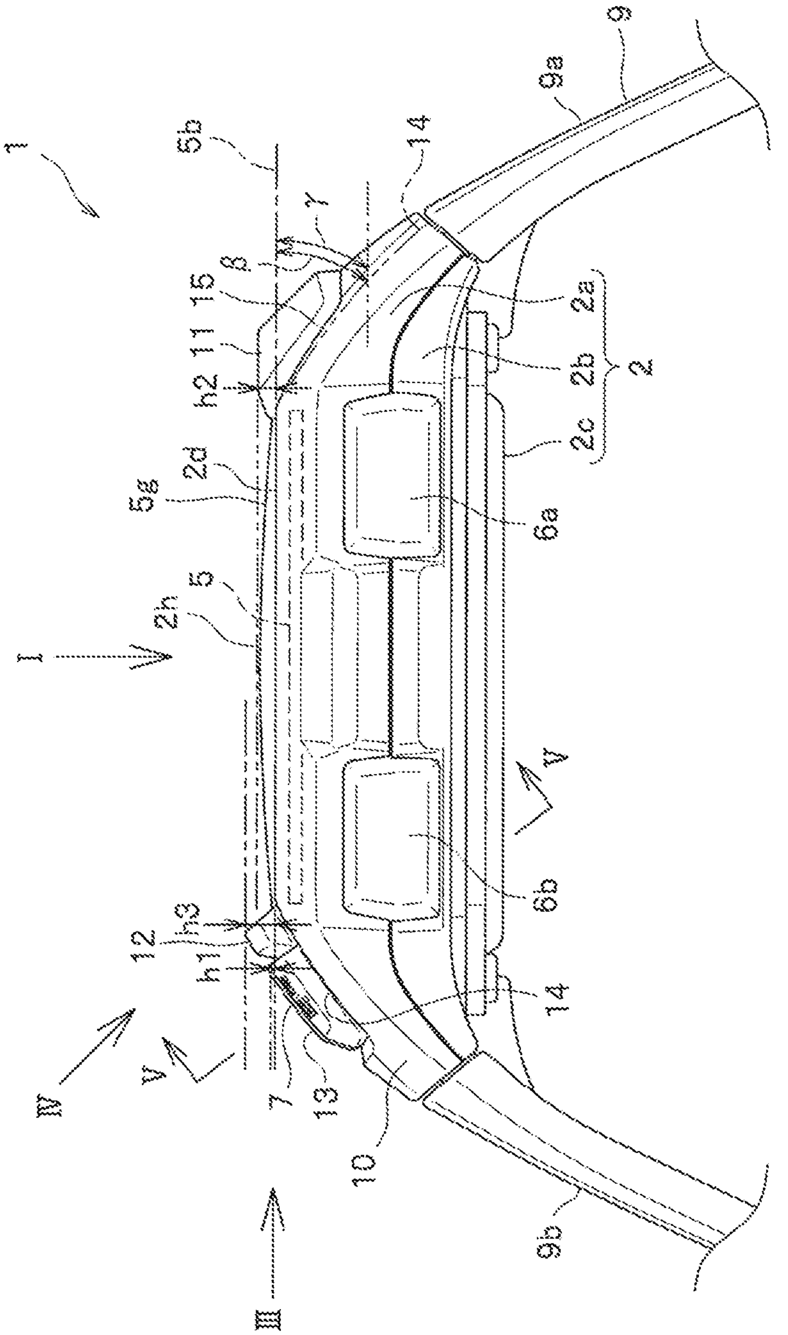
FIG. 2 is a side view for explaining the overall configuration of the electronic timepiece of the first embodiment.
Figure 3:
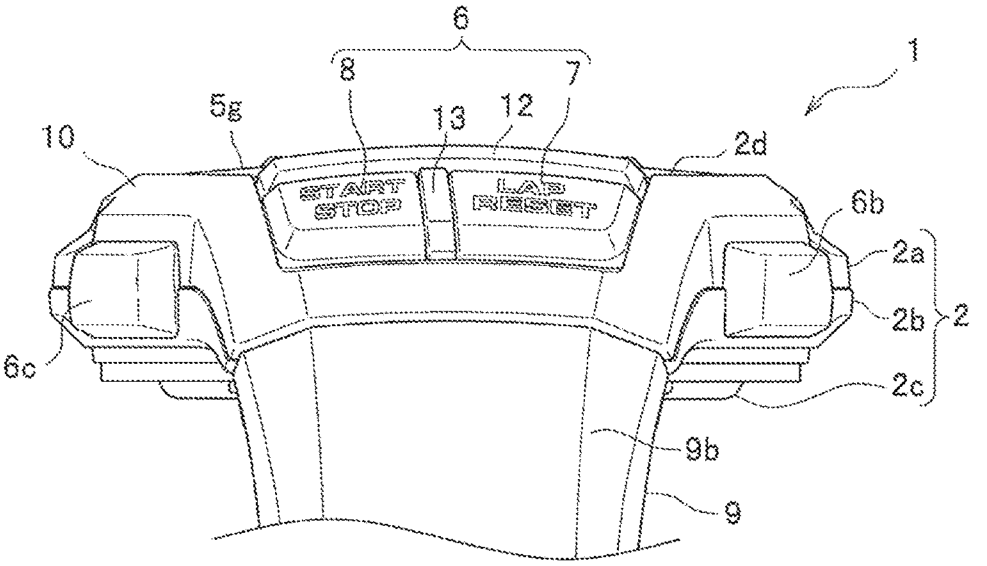
FIG. 3 is a side view illustrating the lower side of the electronic timepiece of the first embodiment as the electronic timepiece is seen from a direction shown by an arrow III in FIG. 2.

As shown in FIG. 2, the case 2 includes a front case 2*a*, an enclosure 2*b*, and a back cover 2*c* for blocking an opening formed on the back side of the enclosure 2*b*, which are separable in the height direction.

Figure 5:
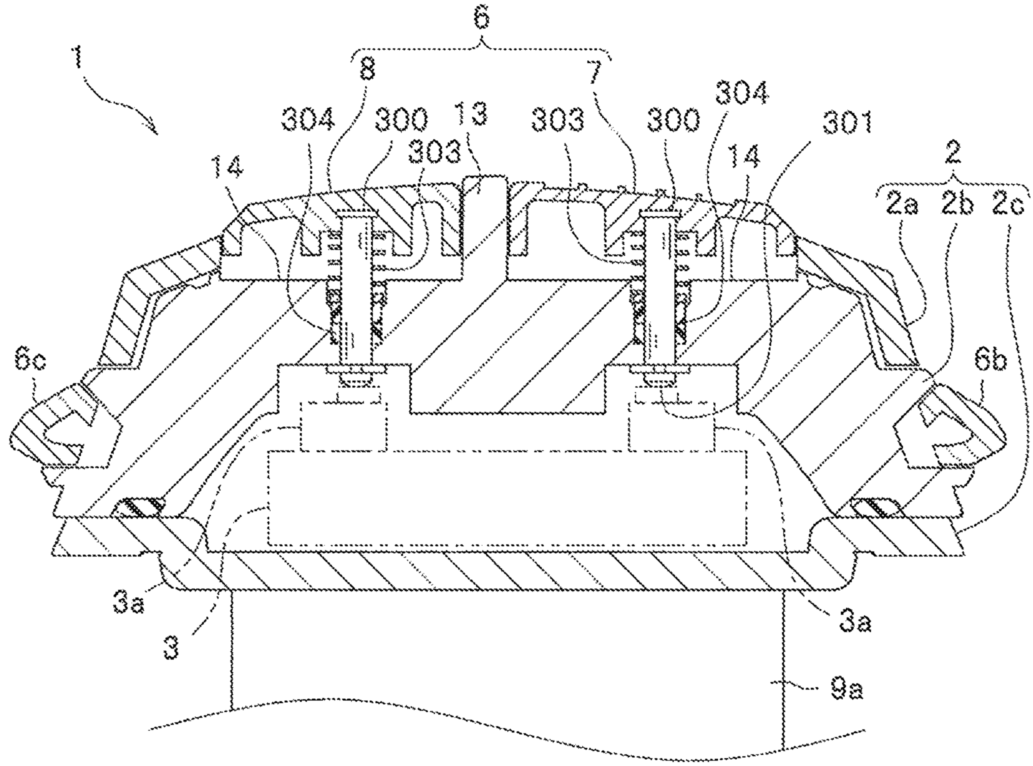
FIG. 5 is a cross-sectional view of the electronic timepiece of the first embodiment taken along a line V-V of FIG. 2.

As shown in FIG. 5, the board 3 is installed inside the case 2. Further, the board 3 has a power supply unit on it. The power supply unit is formed integrally with or separately from the board, and includes a battery and so on for supplying electric power. Also, the board 3 has micro switches which can be turned on and off by pressing buttons and the like of an operation unit 6, a microcomputer, an oscillator, and so on. According to this configuration, the board 3 constitutes an electronic circuit for measuring time.

Moreover, as shown in FIG. 1, the electronic timepiece 1 includes a liquid crystal display 5 which is installed inside the case 2 and displays the measured time, the operation unit 6 having buttons and the like, and the belt parts 9 which can be wrapped around a wrist of the user. The belt parts 9 include a flexible band 9*a* and a flexible band 9*b* extending from the 12 o'clock position and the 6 o'clock position of the case 2, respectively. The band 9*a* and the band 9*b* are connected in a ring shape on a wrist of the user, so as to hold the main device body 10.

The liquid crystal display 5 is covered with cover glass 5*g* which is almost circular as seen from the front side. However, the display unit of the electronic timepiece 1 is not limited to the liquid crystal display 5, and may be, for example, a pointer type (analog type) display, or may have both of them. Also, the cover glass 5*g* is not limited to glass, and may be configured with, for example, plastic or film.

The operation unit 6 includes side buttons 6*a* to 6*d* which protrudes from the side surface part of the case 2, and a large button 7 and a small button 8 which are arranged at the 6 o'clock position of the liquid crystal display 5. Of them, the large button 7 and the small button 8 are installed on a flat part of a button arrangement part 14 (hereinafter, also referred to as the button arrangement part 14) inclined at a predetermined angle from a front reference plane 5*b*.

As shown in FIG. 1, the large button 7 has an inverted trapezoid shape which has a lower base 7*a* having a length W1 and an upper base 7*b* having a length W2 larger than the length of the lower base (W1<W2).

In the large button 7 of the present embodiment, the length W1 of the lower base 7*a* is 6.25 mm, and the length W2 of the upper base 7*b* is 10.75 mm, and the vertical dimension h is 4.75 mm. Also, in the small button 8, the length of the lower base is 7.25 mm, and the length of the upper base is 8.75 mm, and the vertical dimension is 4.25 mm.

In other words, the size of a button to be more frequently used (to be more frequently operated) is set to be larger, and the size of a button to be less frequently used (to be less frequently operated) is set to be smaller. Here, the sizes of the buttons may be changed in proportional to changes in their use frequencies, or may be set on the basis of a non-linear relationship with changes in their use frequencies.

For example, even if the use frequency of the large button 7 is ten times the use frequency of the small button 8, the size of the large button does not need be set to 10 times the size of the small button. Here, the area of the surface of the large button 7 to be pushed is set to be about 1.01 times to 1.5 times that of the small button 8, preferably, about 1.10 times to 1.35 times.

Therefore, in this first embodiment, the start/stop function for the stopwatch function is assigned to the small button 8, and the lap/reset function to be relatively more frequently used is assigned to the large button 7.

Figure 6:
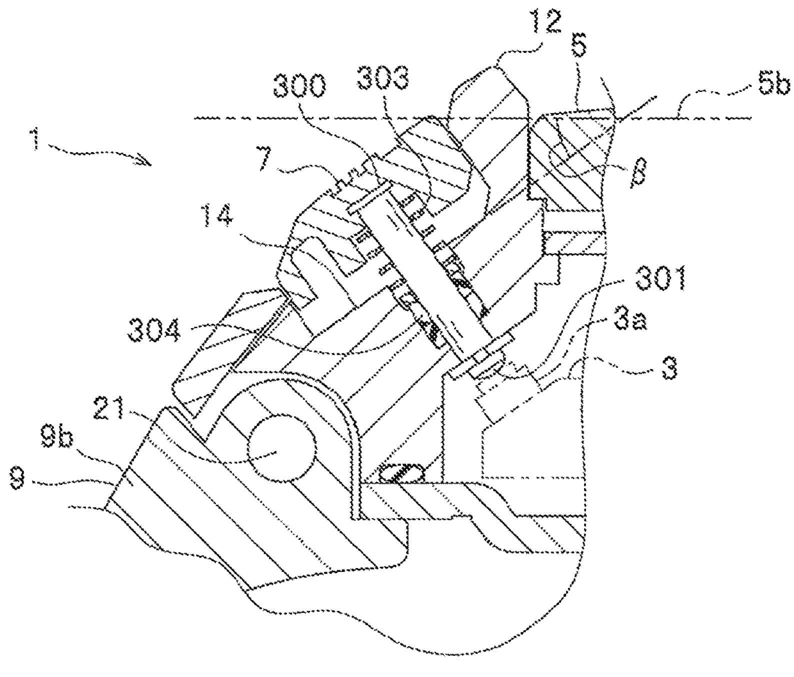
FIG. 6 is a cross-sectional view of the electronic timepiece of the first embodiment taken along a line VI-VI of FIG. 1.

As shown in FIG. 5 and FIG. 6, in the back sides of the large button 7 and the small button 8, ends of pushing pins 300 are integrally fit, respectively. The pushing pins 300 have hemispherical leading ends 301 which are positioned so as to protrude into the case 2.

The large button 7 and the small button 8 are pushed to a direction away from the flat part of the button arrangement part 14 in a direction perpendicular to the flat part, by springs 303 and rubber bushes 304 fit on the pushing pins 300.

If the large button 7 or the small button 8 is pushed, the leading end 301 of the button comes into contact with a micro switch 3*a* on the board 3 stored in the case 2. In this way, it is possible to turn on or off each of the functions assigned to the buttons.

Also, as shown in FIG. 1, on the upper surface part of the case 2, an upper guard part 11 higher than the cover glass 5*g* (see FIG. 2) is provided along an upper edge 5*c* of the cover glass 5*g*, so as to protrude from a flat fixing surface 15. This upper guard part 11 of the first embodiment has a vertical cross section shape protruding toward the height direction. Moreover, the upper guard part has a dimension in the transverse width direction, substantially same as the dimension of the band 9*a* in the width direction, and is provided in an arc shape between the connection part for the band 9*a* and the upper edge 5*c* of the cover glass 5*g*.

Also, between the cover glass 5*g* and both of the large button 7*a* and the small button 8, a lower guard part 12 is provided along the lower edge of the cover glass 5*g*. As shown in FIG. 1, the lower guard part 12 is formed in a curved shape along the curved shape of the lower edge side 5*a* of the liquid crystal display 5, and is higher than the cover glass 5*g* (see FIG. 2). Here, the height direction is the same as the thickness direction of the main device body 10, and is the direction away from the viewer of FIG. 1.

Moreover, in this first embodiment, as shown in FIG. 1, a longitudinal guard part 13 for diving the large button 7 and the small button 8 from each other is provided in the direction from the lower edge of the lower guard part 12 toward the band 9*b*. This longitudinal guard part 13 is positioned between the large button 7 and the small button 8 having the inverted trapezoid shapes. Also, this longitudinal guard part 13 of the first embodiment is formed integrally with the lower guard part 12, such that the longitudinal guard part is level with the lower guard part and the longitudinal guard part and the lower guard part have a substantial T shape as seen from the front side.

Figure 4:
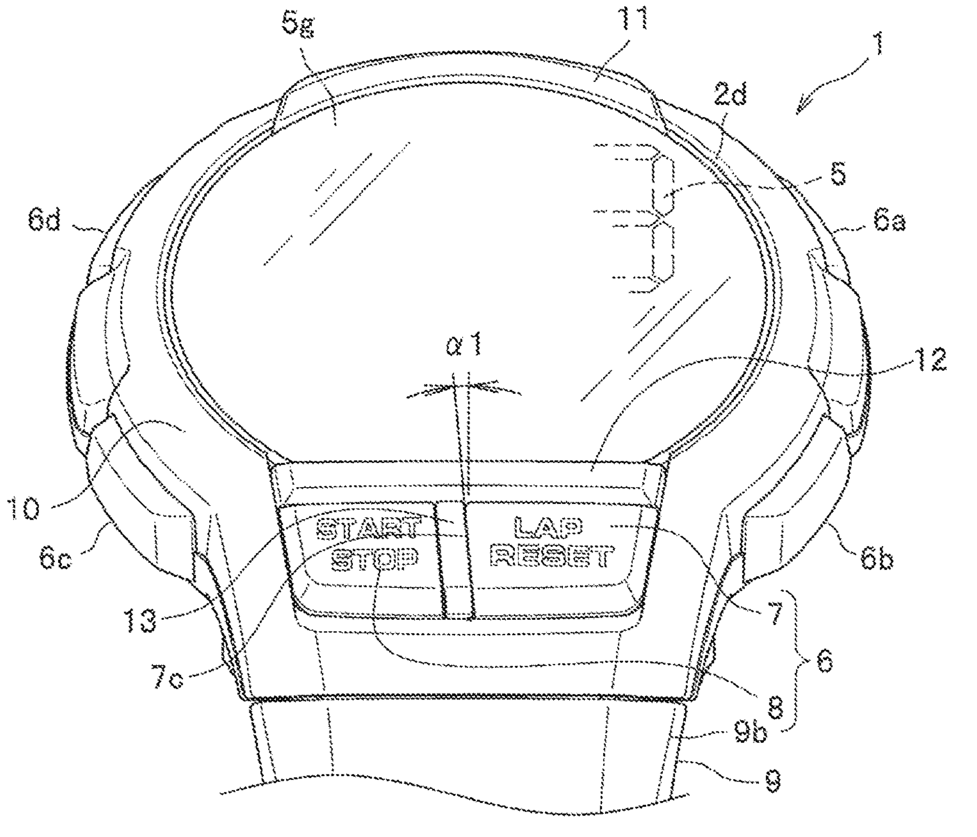
FIG. 4 is a perspective view illustrating the electronic timepiece of the first embodiment as the electronic timepiece is seen from a direction shown by an arrow IV in FIG. 2.

As shown in FIG. 4, this longitudinal guard part 13 of the first embodiment is positioned to be inclined at a predetermined angle α1 to the left as if it tilts along a side edge 7*c* of the large button 7 having the inverted trapezoid shape. In this first embodiment, the predetermined angle α1 is about 5 degrees.

As shown in FIG. 2, when the height of the front reference plane 5*b* of the cover glass 5*g* is referred to, the height h2 of the upper guard part 11 and the height h3 of the lower guard part 12 are larger than the height h1 of the large button 7 and the small button 8 (h2>h1 and h3>h1). The height h3 of the lower guard part 12 is larger than the height h2 of the upper guard part 11 (h3>h2).

Also, in the main device body 10 of this first embodiment, as shown in FIG. 2, at the same height, the inclination angle β of the button arrangement part 14 for the large button 7 and the small button 8 relative to the front reference plane 5*b* of the cover glass 5*g* is larger than the inclination angle γ of the fixing surface 15 for the upper guard part 11 relative to the front reference plane 5*b* (β>γ) (for example, β may be about 40 degrees, and γ may be about 38 degrees).

Here, the front reference plane 5*b* is a plane including the front end edge of a flat frame part (see FIG. 4) positioned around the cover glass 5*g*. In the electronic timepiece 1 of this first embodiment, the front reference plane 5*b* is almost level with the front surface of the cover glass 5*g* except for a convex part 2*h* (see FIG. 2). Also, the front reference plane 5*b* is parallel with the back cover 2*c* which is positioned on the back side of the main device body 10.

In FIG. 2, for ease of understanding, the front reference plane 5*b* is shown by an alternate long and two short dashes line which is obtained by transferring the inclination angle β of the button arrangement part 14 to the upper guard part (11) side with respect to the center line of the main device body 10. Therefore, it can be seen that when the inclination angle γ of the fixing surface 15 and the inclination angle β of the button arrangement part 14 at the same height from the front reference plane 5*b* are compared, the inclination angle β is larger than the inclination angle γ (β>γ).

Now, the effects of the electronic timepiece 1 of the present embodiment will be described.

Figure 7:
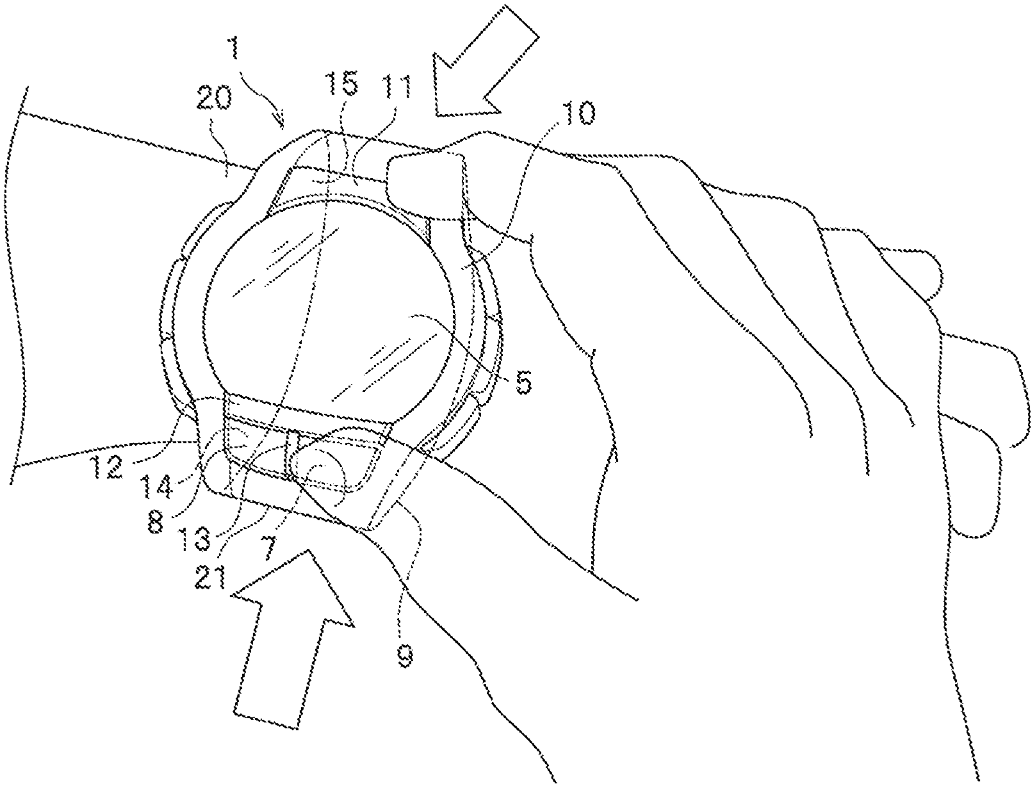
FIG. 7 is a conceptual view illustrating a state where a user is measuring time such as a lap time with the electronic timepiece.

The electronic timepiece 1 of the first embodiment shown in FIG. 7 has the button arrangement part 14 between the cover glass 5*g* and a connection part 21 to which a belt part 9 for holding the main device body 10 on a wrist 20 is connected. As shown in FIG. 6, the button arrangement part 14 is inclined at the predetermined angle β from the front reference plane 5*b*, and has thereon the large button 7 and the small button 8 having different sizes depending on their use frequencies.

To the large button 7 and the small button 8 installed side by side on the button arrangement part 14 of the first embodiment, the start/stop function and the lap/reset function for the stopwatch function are assigned, respectively. Since it is considered to frequently measure lap times during running, the lap/reset function to be more frequently used than the start/stop function is assigned to the large button 7.

Therefore, even while running, the user can easily perform an operation of pressing the large button 7 as an operation for measuring a lap time. Moreover, the neighboring small button 8 has the size and shape different from those of the large button 7, and is smaller than the large button 7. The large button 7 has the area of the surface to be pushed, larger than that of the small button 8, and also has the inverted trapezoid shape in which the length of the upper base is longer than the length of the lower base. For this reason, when the user touches them with a finger, they feel different. Therefore, the user can discriminate the large button 7 and the small button 8. Therefore, it is easy to push a button, and it is difficult to perform unintended operations.

As shown in FIG. 1, the large button 7 has the inverted trapezoid shape in which the length W2 of the upper base 7*b* is larger than the length W1 of the lower base 7*a* (W1<W2).

For this reason, as it goes to the lower guard part 12, the large button 7 widens to the left and the right, i.e. the area which can be pushed by a finger increases. Therefore, in the vicinity of the lower guard part 12 serving as a stopper, the length W2 of the upper base 7*b* is maximum. Therefore, it is easier to push the large button 7.

Also, since it goes to the lower guard part 12, the large button 7 enlarges, and the difference in size between the large button 7 and the small button 8 arranged close to each other becomes more clear. Therefore, it becomes easier to discriminate the lap/reset button from the other button and recognize it.

As shown in FIG. 2, the front case 2*a* has the upper guard part 11 higher than the front reference plane 5*b*. Also, the front case has the lower guard part 12 curved in a curved shape along the curved shape of the lower edge side 5*a* of the liquid crystal display 5 and higher than the cover glass 5*g*.

Therefore, the upper guard part 11 and the lower guard part 12 protect the cover glass 5*g* from objects which collide with the electronic timepiece. Therefore, it is possible to reduce the risk that the display unit including the cover glass 5*g* will be broken. Particularly, when the large button 7 or the small button 8 is operated, the upper guard part 11 and the lower guard part 12 can protect the cover glass 5*g* from being directly touched and contaminated by a finger.

When operating the large button 7 or the small button 8, as shown in FIG. 7, the user can crook the index finger, the middle finger, the ring finger, or the picky finger (hereinafter, referred to simply as a fingertip) and put the fingertip on the convex shape of the upper guard part 11. Then, when pushing a button, it is possible to fix the main device body 10 from the opposite side in order to prevent the main device body from moving.

Therefore, even during running, it is possible to operate the large button 7 or the small button 8 in a stable state.

In the case of the electronic timepiece 1 of the first embodiment, it is possible to check the positions of the large button 7 and the small button 8 and discriminate them in a stable state by putting a fingertip on the upper guard part 11. Also, it is possible to surely perform an operation of the large button 7 or the small button 8 by applying a force in such a direction that the fingertip and the thumb can get close to each other (such a direction that the main device body can be pressed hard between the fingertip and the thumb).

Also, the lower guard part 12 is formed so as to be relatively higher and have a curved shape along the curved shape of the lower edge side 5*a* of the liquid crystal display 5. Therefore, the lower guard part 12 interferes with the thumb to move toward the cover glass 5*g*. Therefore, it is easy to identify a rough position which should be pushed, and apply a force in such a direction that the large button 7 or the small button 8 can be pushed.

Moreover, the upper guard part 11 of the present embodiment has a dimension in the transverse width direction, substantially same as the dimension of the band 9*a* in the width direction, and extends along the upper edge 5*c* of the cover glass 5*g*. Therefore, the user can put a fingertip on the upper guard part 11 which is positioned on the opposite side of the cover glass 5*g* to a button which the user wants to push, and operate the desired button in a stable state by applying a force in such a direction that the case 2 can be hold from both sides.

In this first embodiment, the large button 7 and the small button 8 are arranged on the left side and the right side, side by side, within a transverse width having a dimension substantially same as the dimension of the band 9*a* in the width direction. Even in the case where the plurality of buttons is positioned side by side along the lower edge side 5*a* as described above, the upper guard part 11 is on the opposite side of the cover glass 5*g* to the large button 7 and the small button 8.

Therefore, when operating any one of the large button 7 and the small button 8, the user can put a fingertip on the upper guard part 11 and use the fingertip to assist in performing the operation.

Also, in this first embodiment, as shown in FIG. 2, the height h2 of the upper guard part 11 and the height h3 of the lower guard part 12 are larger than the height h1 of the large button 7 and the small button 8 (h2>h1 and h3>h1). Moreover, the height h3 of the lower guard part 12 is larger than the height h2 of the upper guard part 11 (h3>h2).

In other words, the height h3 of the lower guard part 12 is larger than the height h1 of the large button 7 and the small button 8 and the height h2 of the upper guard part 11.

Therefore, the lower guard part 12 can protect the large button 7 and the small button 8 from objects which collide with the electronic timepiece, such that the large button 7 and the small button 8 are not erroneously operated. Also, damage to the large button 7 and the small button 8 decreases.

Also, when a fingertip moves toward the cover glass 5*g*, even if the fingertip passes the large button 7 and the small button 8, the fingertip comes into contact with the lower guard part 12 which interferes with the fingertip to move. Therefore, it is easy to recognize the positions of the large button 7 and the small button 8, and it is easy to apply a force in such a direction that the large button 7 or the small button 8 can be pushed.

Also, it is possible to configure the large button 7 and the small button 8 such that a desired projection height from the button arrangement part 14 is secured. Therefore, it possible to improve the freedom of shaping and increase the size and height of the large button 7, such that the recognition rate can be further improved.

As shown in FIG. 1, the lower guard part 12 is formed in a curved shape along the curved shape of the lower edge side 5*a* of the liquid crystal display 5.

Therefore, it is possible to install the large button 7 and the small button 8 such that their bases such as the upper base 7*b* extend along the curved shape of the lower guard part 12, and by increasing the areas of the large button 7 and the small button 8 and increasing the areas of them to be pushed obliquely, it is possible to make pushing easier.

Also, as shown in FIG. 1, the longitudinal guard part 13 is formed integrally with the lower guard part 12, such that the longitudinal guard part and the lower guard part have a T shape as seen from the front side. Therefore, as shown in FIG. 7, when operating the large button 7, a fingertip is guided along the recessed corner formed by the longitudinal guard part 13 and the lower guard part 12. Therefore, the fingertip is prevented from coming into contact with the small button 8. Therefore, it is easy to operate the large button 7.

As described above, the large button 7 and the small button 8 are divided from each other by the lower guard part 12 positioned between the large button 7 and the small button 8. Therefore, the risk of confusing the large button 7 and the small button 8 and operating a wrong button further decreases.

Moreover, the longitudinal guard part 13 is formed integrally with the lower guard part 12, such that the longitudinal guard part and the lower guard part have a T shape as seen from the front side. Therefore, as compared to the case where the longitudinal guard part 13 is separately provided, the durability is better. Particularly, as compared to the case where the longitudinal guard part 13 is separated from the lower guard part 12, the strength in the tilting direction, i.e. the left-right direction improves.

For example, the large button 7 is frequently operated, and is frequently searched with a fingertip to operate the button. However, the longitudinal guard part 13 is formed integrally with the lower guard part 12, such that the longitudinal guard part and the lower guard part have a T shape as seen from the front side. Therefore, the shearing force of the longitudinal guard part 13 in the tilting direction increases. As a result, even if the longitudinal guard part is pushed when the large button 7 or the small button 8 adjacent to the longitudinal guard part is operated, the longitudinal guard part exerts a sufficient strength to maintain its shape.

Moreover, as shown in FIG. 4, the longitudinal guard part 13 is inclined at the predetermined angle α1 to the left, and is positioned along the side edge 7*c* of the large button 7 having the inverted trapezoid shape.

Therefore, it is possible to improve the freedom of shaping. For example, it is possible to set the length of the upper base 7*b* of the large button 7 to be large, thereby increasing the area of the large button 7.

Also, since the longitudinal guard part 13 is inclined at the predetermined angle α1 to the left, it is possible to decrease the area of the small button 8, so it is possible to further suppress erroneous operations.

Also, as shown in FIG. 2, the inclination angle β from the front reference plane 5*b* is larger than the inclination angle γ (β>γ). Therefore, as shown in FIG. 7, when a force is applied in such a direction that the index finger and the thumb can get close to each other (such a direction that the main device body can be pressed hard between the index finger and the thumb), since the push direction of the large button 7 or the small button 8 is inclined, the force is easily directed to the center of the cover glass 5*g*.

Therefore, it is easy to apply a force in such a direction that the main device body 10 between the index finger put on the upper guard part 11 and the inner surface of the thumb can be pressed from the upper and lower sides, and more stable button operations are possible.

Also, as shown in FIG. 6, in the electronic timepiece 1 of the first embodiment, the button arrangement part 14 is inclined at the inclination angle β from the front reference plane 5*b* of the cover glass 5*g*. The large button 7 and the small button 8 installed on the button arrangement part 14 can be pushed obliquely along the movement directions of the pushing pins 300.

Therefore, it is possible to further increase the inclination angle of the front surfaces of the large button 7 and the small button 8 such that the inclination angle becomes equal to the angle of the inner surface of the thumb performing a button operation. Therefore, when pushing the large button 7 or the small button 8, the thumb is unlikely to slide, and it is easy to perform the button operation.

In the electronic timepiece 1 of the first embodiment, between the display unit and the part to which the band 9*b* is connected, the button arrangement part 14 having the plurality of buttons thereon is positioned.

Moreover, it is possible to incline the push direction of the large button 7 or the small button 8 obliquely toward the center of the cover glass 5*g*, such that the push direction is directed to the index finger put on the upper guard part 11. Therefore, it is easy to put the index finger and the thumb on the upper and lower sides of the main device body 10 such that the fingers face each other, and apply a force to press the main device body from both sides. Therefore, more stable button operations become possible.

Also, in the device with buttons according to the first embodiment, as the operation unit 6, besides the side buttons

6*a* to 6*d* installed on the side surface part of the case 2, the large button 7 and the small button 8 are installed.

Therefore, in the device with buttons according to the first embodiment, as compared to the case where only the side buttons 6*a* to 6*d* are installed, it is possible to operate more functions by assigning different functions to the individual buttons. Also, in the device with buttons according to the first embodiment, even if the number of functions is increased, it is unnecessary to decrease the space between buttons. Also, in the device with buttons according to the first embodiment, even if the number of functions is increased, it is possible to suppress a decrease in the button sizes.

Also, as shown in FIG. 6, between the cover glass 5*g* and the connection part 21 to which a belt part 9 is connected, the button arrangement part 14 is positioned. For example, even if an object collide with the electronic timepiece from the side direction of the main device body 10, the large button 7 and the small button 8 are protected by the belt part 9 and the main device body 10. Therefore, as compared to the side buttons 6*a* to 6*d* protruding the side surface part of the case 2, it is possible to reduce the possibility that the large button and the small button will be broken.

Second Embodiment

FIG. 8 to FIG. 13 are views illustrating an electronic timepiece 201 of a second embodiment which is a device with buttons wearable on a wrist. Also, parts identical to or equivalent to those of the first embodiment are denoted by the same reference symbols, and a description thereof will not be made.

Figure 8:
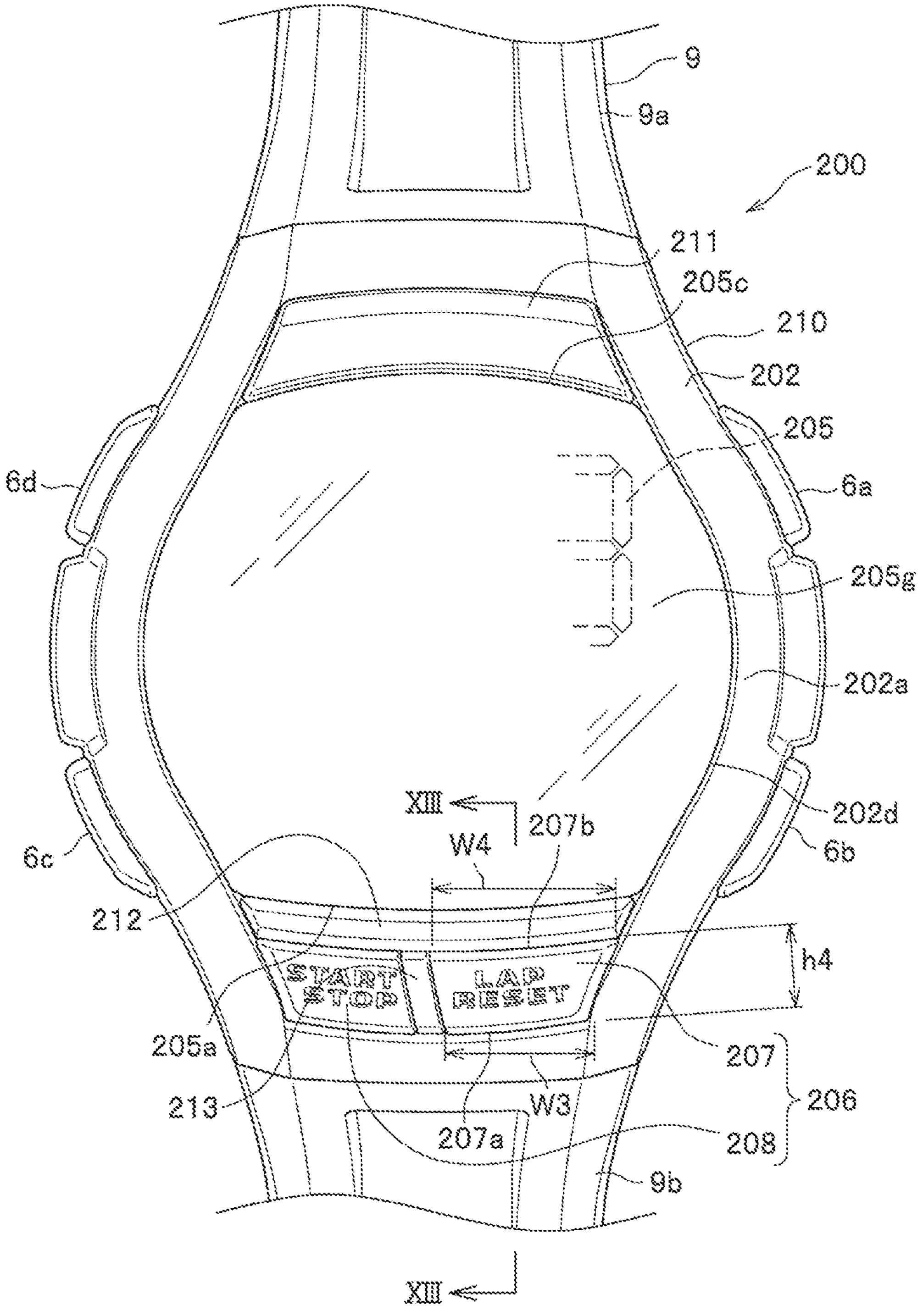
FIG. 8 is a front view illustrating an electronic timepiece as a device with buttons according to a second embodiment as the electronic timepiece is seen from a direction shown by an arrow IX in FIG. 9.

First, the configuration difference will be described. In the electronic timepiece 201 of the second embodiment, as shown in FIG. 8, a liquid crystal display 205 installed in a case 202 of a main device body 210 is covered by cover glass 205*g* having a drum shape as seen from the front side. Also, each of a front case 202*a*, an upper guard part 211, and a lower guard part 212 is positioned along the circumference of the cover glass 205*g*.

An operation unit 206 of the electronic timepiece 201 includes a large button 207 and a small button 208 which are arranged at the 6 o'clock position of the liquid crystal display 205 similarly in the first embodiment. The large button 207 and the small button 208 are installed on a button arrangement part 214 inclined at a predetermined angle $\beta 2$ from a front reference plane 205*b* (see FIG. 13). Of them, the large button 207 has an inverted trapezoid shape which has a lower base 207*a* having a length W3 and an upper base 207*b* having a length W4 longer than the length of the lower base (W3<W4).

In this second embodiment, in the large button 207, the length W3 of the lower base 207*a* is 8.25 mm, and the length W4 of the upper base 207*b* is 10.75 mm, and the vertical dimension h4 is 4.25 mm. Also, in the small button 208, the length of the lower base is 7.25 mm, and the length of the upper base is 7.75 mm, and the height is 4.25 mm.

Also, in the second embodiment, the start/stop function for the stopwatch function is assigned to the small button 208. Also, the lap/reset function for the stopwatch function to be relatively more frequently used is assigned to the large button 207.

Also, in this second embodiment, as shown in FIG. 8, between the large button 207 and the small button 208 having the inverted trapezoid shapes, a longitudinal guard part 213 is positioned. The longitudinal guard part 213 is provided integrally with the lower guard part 212 so as to extend from the lower edge of the lower guard part toward the connection part for the band 9*b*, such that the longitudinal guard part and the lower guard part have a substantial T shape as seen from the front side. By the longitudinal guard part 213, the large button 207 and the small button 208 are divided from each other.

Figure 11:
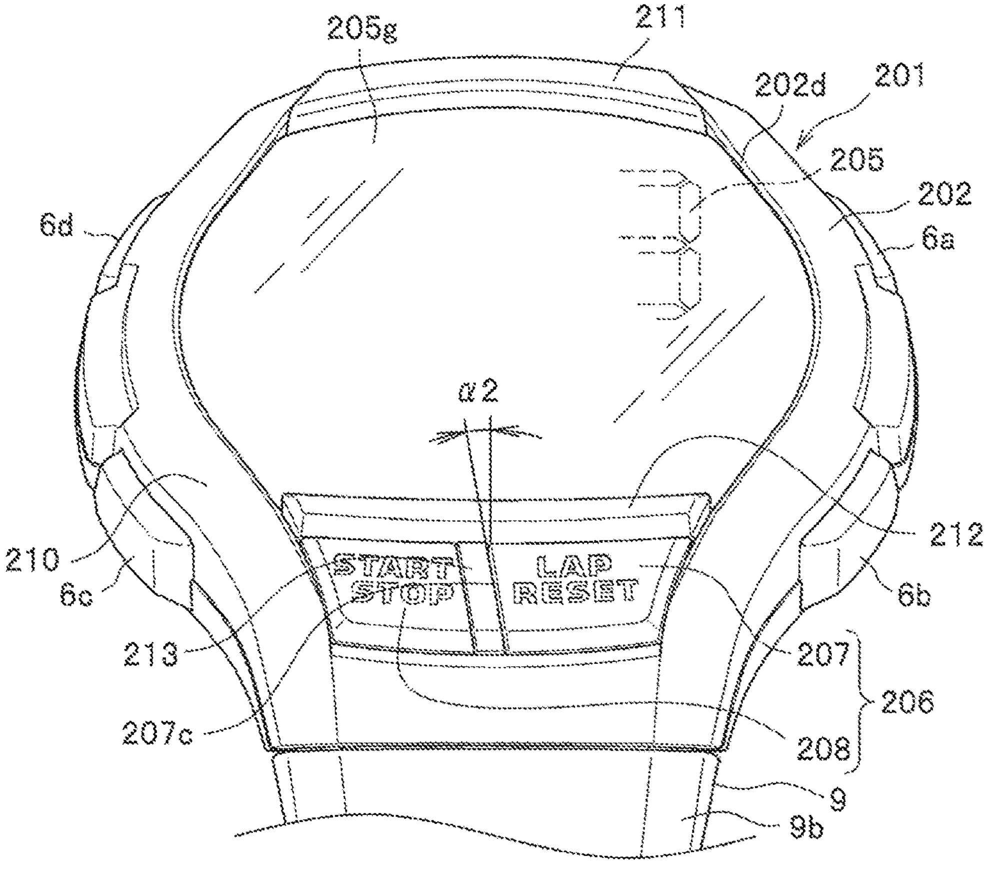
FIG. 11 is a perspective view illustrating the electronic timepiece of the second embodiment as the electronic timepiece is seen from a direction shown by an arrow XI in FIG. 9.
Figure 12:
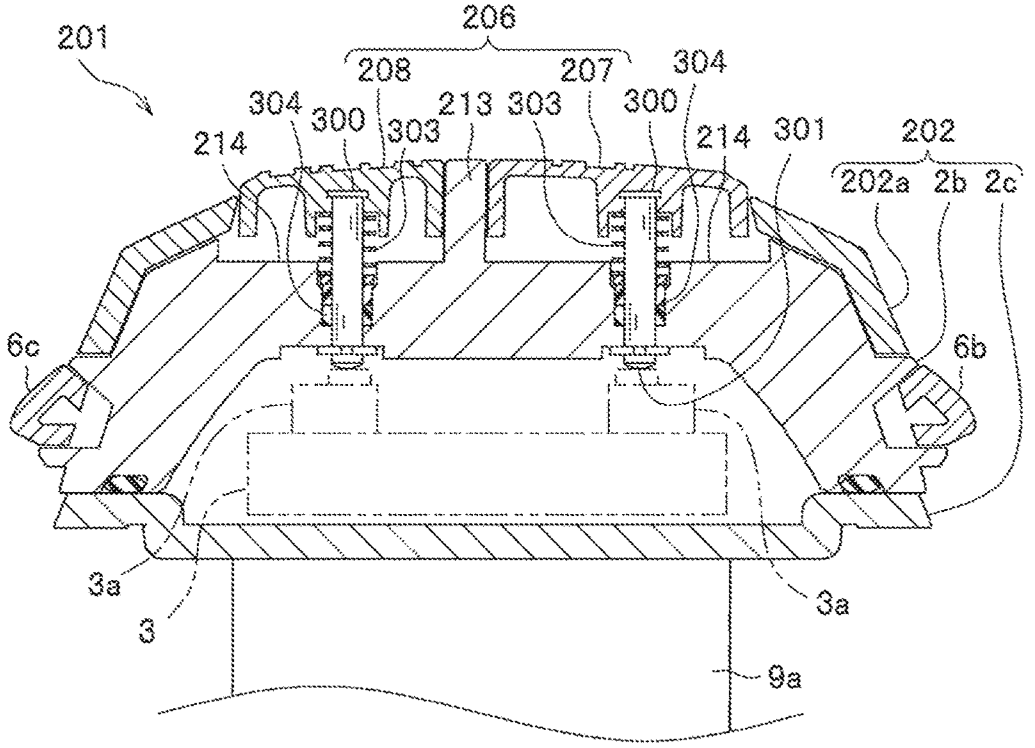
FIG. 12 is a cross-sectional view of the electronic timepiece of the second embodiment taken along a line XII-XII of FIG. 9.

As shown in FIG. 11, this longitudinal guard part 213 of the second embodiment is inclined at a predetermined angle $\alpha 2$ to the left, and is positioned along a side edge 207*c* of the large button 207 having the inverted trapezoid shape.

In this second embodiment, the predetermined angle $\alpha 2$ is about 10.151 degrees.

Figure 9:
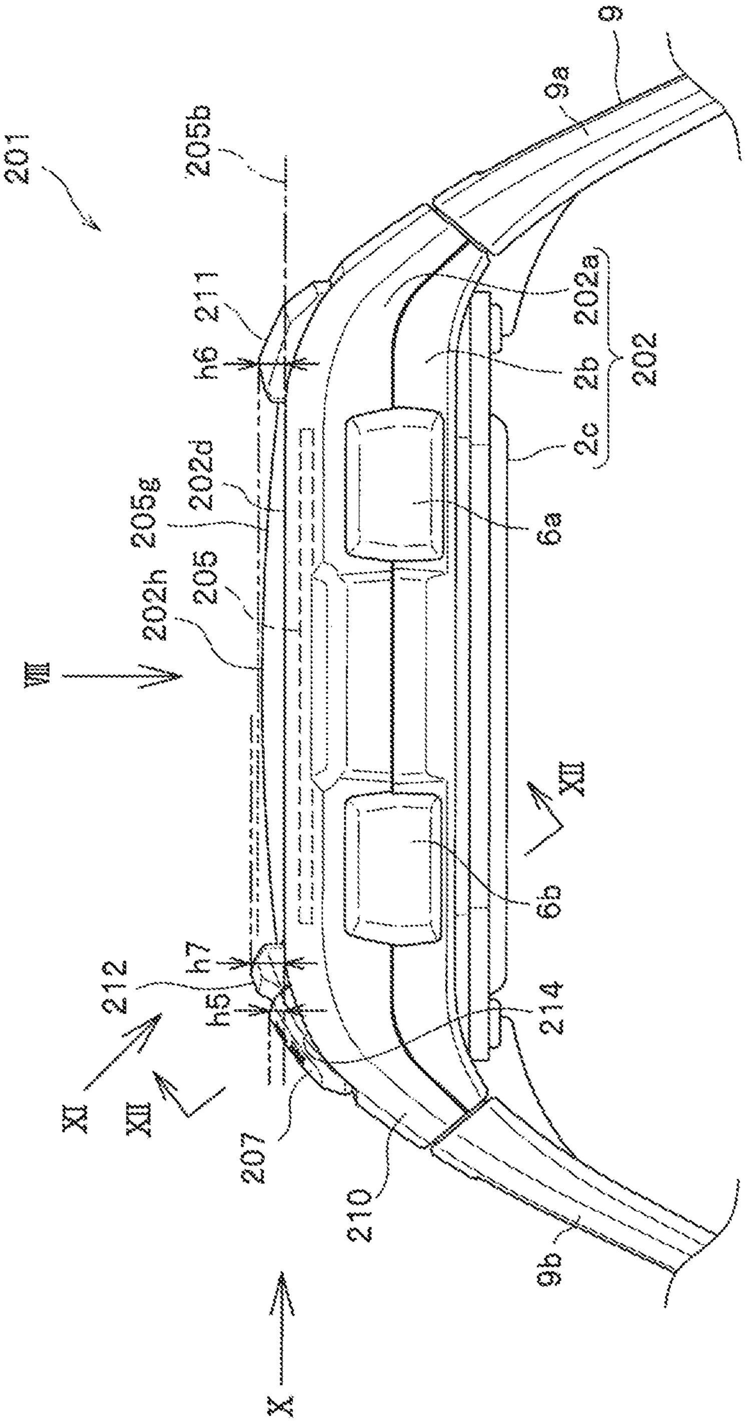
FIG. 9 is a side view for explaining the overall configuration of the electronic timepiece of the second embodiment.
Figure 10:
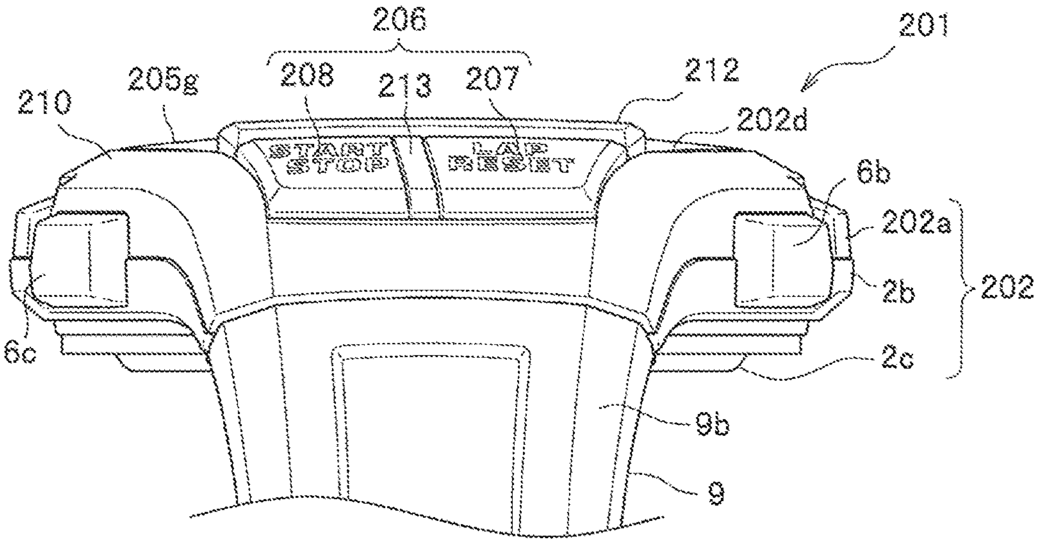
FIG. 10 is a side view illustrating the lower side of the electronic timepiece of the second embodiment as the electronic timepiece is seen from a direction shown by an arrow X in FIG. 9.

Also, in this second embodiment, as shown in FIG. 9, when the height of the front reference plane 205*b* on the front surface side of the cover glass 205*g* is referred to, the height h6 of the upper guard part 211 and the height h7 of the lower guard part 212 are larger than the height h5 of the large button 207 and the small button 208 (h6>h5 and h7>h5). Moreover, the height h7 of the lower guard part 212 is larger than the height h6 of the upper guard part 211 (h7>h6).

Figure 13:
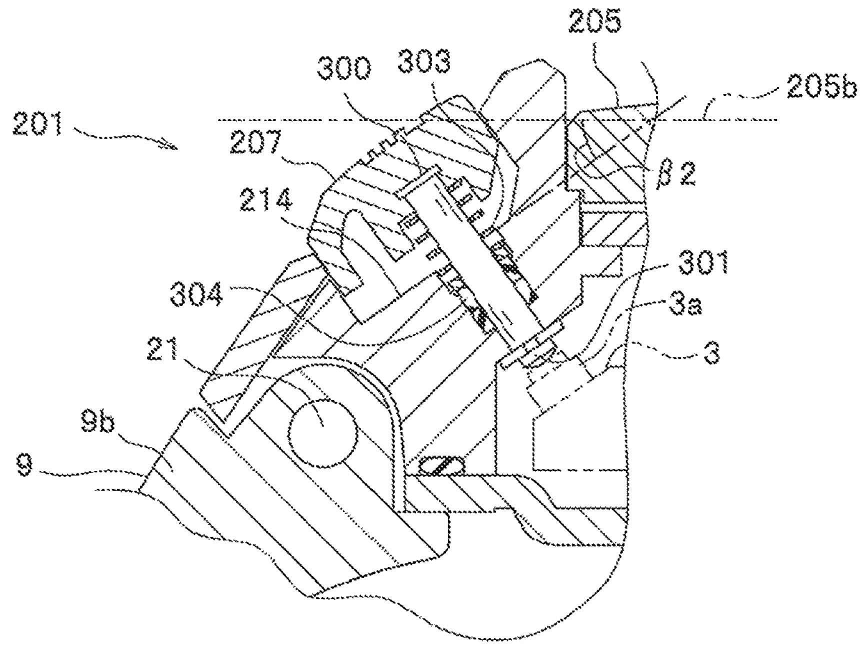
FIG. 13 is a cross-sectional view of the electronic timepiece of the second embodiment taken along a line XIII-XIII of FIG. 8.

Also, the inclination angle $\beta 2$ of the button arrangement part 214 of the second embodiment shown in FIG. 13 is about 45 degrees, similarly in the first embodiment. Furthermore, as compared to the inclination angle of a fixing surface 215 having the upper guard part 211, shown in FIG. 9, on it, the inclination angle $\beta 2$ is larger at the same height. However, as long as the inclination angle $\beta 2$ is larger than the inclination angle of the fixing surface 215 of the upper guard part 211, it may be an angle larger than 40 degrees which is the inclination angle of the fixing surface 215 of the upper guard part 211, such as about 42 degrees or about 50 degrees.

In the electronic timepiece 201 of the second embodiment configured as described above, besides the effects of the electronic timepiece 1 of the first embodiment, according to the shapes of the liquid crystal display 205 and the cover glass 205*g*, the shapes of the upper guard part 211, the lower guard part 212, the large button 207, and the small button 208 are determined.

For example, if FIG. 1 and FIG. 8 are compared, the longitudinal guard part 213 is inclined at the predetermined angle $\alpha 2$ larger than that of the longitudinal guard part 13, to the left. Therefore, it is possible to extend the upper base 207*b* of the large button 207 having the inverted trapezoid shape toward the small button 208.

Also, the lower guard part 212 is curved more than the lower guard part 12 is. Therefore, in the second embodiment, it is possible to further extend the upper base 207*b* of the large button 207 toward an upper end surface 202*d* of the front case 202*a*.

Therefore, the ratio of the upper base 207*b* and the lower base 207*a*, i.e. W4/W3 further increases. For this reason, it is possible to make the large button in a trapezoid shape widening as it goes toward the lower guard part 212, i.e. toward the push direction. Therefore, it is possible to more easily push the large button 207.

In other words, it is possible to form the large button 207 and the small button 208 in various shapes and sizes, depending on their use frequencies.

The other components and effects are the same as or equivalent to those of the first embodiment, so a description thereof will not be made.

As described above, in the electronic timepiece 1 of the first embodiment, the large button 7 and the small button 8 having different sizes depending on their use frequencies are arranged collectively on the lower side of the liquid crystal display 5, and in the electronic timepiece 201 of the second embodiment, the large button 207 and the small button 208 having different sizes according to their use frequencies are arranged collectively on the lower side of the liquid crystal display 205. Therefore, by providing the upper guard part 11 on the upper side and put a fingertip thereon, it is possible to effectively receive a force pushing the button. Therefore, it becomes easy to push.

Also, although the plurality of buttons are collectively arranged, since they have different sizes depending on their use frequencies, they are easily discriminated.

The first and second embodiments can be modified in various forms. The above-described first and second embodiments are examples, and do not necessarily need to have all of the components described above. Also, it is possible to replace some of the components of each of the first and second embodiments with components of the other one of the first and second embodiments, and it is also possible to add a component of one of the first and second embodiments to the configuration of the other one of the first and second embodiments. Also, with respect to some of the components of each of the first and second embodiments, it is possible to perform removal of them, addition of other components, or replacement with other components. Modifications which can be made with respect to the first and second embodiments are, for example, as follows.

Although the devices with buttons according to the first and second embodiments have been described using the watch type electronic timepieces 1 and 201 which can be hold on a wrist with the bands; however, they are not particularly limited thereto. For example, the devices with buttons according to the first and second embodiments may be devices with buttons having sizes depending on their use frequencies, such as pocket watch type stopwatches and watch type information terminals which can be hold on a wrist with bands. The devices with buttons according to the first and second embodiments are not particularly limited in shapes, numerical quantities, materials, and purposes.

The device with buttons according to the first or second embodiment has the side buttons 6*a* to 6*d* installed on the side surface part of the case 2 or 202, and either both of the large button 7 and the small button 8 or both of the large button 207 and the small button 208 which are arranged on the button arrangement part provided at the 6 o'clock position of the display unit, as the operation unit 6. However, the number of buttons is not particularly limited, and three or more buttons may be arranged on the button arrangement part. For example, a total of four buttons may be arranged in a two-by-two matrix.

Even in this case, as compared to the case where only the side buttons 6*a* to 6*d* are installed, it is possible to operate more different functions by assigning those functions to the individual buttons, respectively.

Also, the arrangement positions of the large button 207 and the small button 208 in the left-right direction are not limited to the first embodiment, and the large button 207 and the small button 208 may be arranged on the left side and the right side, respectively.

Also, the sizes and shapes of the large buttons 7 and 207 and the small buttons 8 and 208 are not particularly limited to the first and second embodiments. For example, as long as the size of the small button is set depending on the use frequency, even though the small button has any shape such as a round shape and any size, the shapes, numerical quantities, and materials of the large and small buttons are not particularly limited.

Also, the shape of the upper guard part 11 is not limited to the arc shape, and a plurality of upper guard parts 11 may be arranged at intervals as long as a fingertip can be easily hooked.

Also, the angles $\alpha$1 and $\alpha$2 of the longitudinal guard parts 13 and 213 are not particularly limited to the first and second embodiments. For example, the angles $\alpha$1 and $\alpha$2 may be angles between 0.1 degrees to 45 degrees. Also, the heights of the longitudinal guard parts 13 and 213 are not limited to the first and second embodiments, and may be set to any other heights.

Also, the longitudinal guard parts 13 and 213 may not be linear, and may be formed in any other shape, such as an arc shape or a curved shape whose angle varies in some parts. Also, as long as the longitudinal guard part 13 is positioned between the large button 7 and the small button 8, it may be formed integrally with the lower guard part 12, and as long as the longitudinal guard part 213 is positioned between the large button 207 and the small button 208, it may be formed integrally with the lower guard part 212. In other words, the shapes, numerical quantities, and materials of the longitudinal guard part 13 and so on are not particularly limited.

Also, in the first and second embodiments, the inclination angle $\beta$ of the button arrangement parts 14 and 214 is set to about 40 degrees; however, it is not particularly limited. For example, the inclination angle $\beta$ may be any other angle within a range between 10 degrees and 80 degrees, more preferably, a range between 35 degrees and 55 degrees, as long as the inclination angle $\beta$ is larger than the inclination angle $\gamma$ of the fixing surface 15 of the upper guard part 11 relative to the front reference plane 5*b* ($\beta>\gamma$).

Also, the display unit is not limited to the liquid crystal display 5 and the pointer type display, and may be any other display type, such as an organic EL display or an inorganic EL display.

Also, the cover glass 5*g* or 205*g* is not essential, and the front surface of the display may be exposed.

The invention claimed is:

1. A watch comprising:
a display configured to display a time;
at least two buttons around the display,
a case accommodating the display; and
a belt part connected to the case,
wherein the at least two buttons are positioned along a lower side of the display and adjacent to each other within a width of the belt part,
wherein a first one of the at least two buttons is assigned to functionality that is used during exercise, and
wherein a second one of the at least two buttons is assigned to functionality that is used at a start or an end of the exercise.

2. The watch according to claim 1, wherein
the first one of the at least two buttons is larger than the second one of the at least two buttons.

3. The watch according to claim 1, further comprising:
an upper guard part that is positioned along an upper edge of the display.

4. The watch according to claim 3, wherein
a length of the upper guard part in a three-nine o'clock direction is shorter than that of the display in the three-nine o'clock direction.

5. The watch according to claim 4, wherein
the length of the upper guard part in a three-nine o'clock direction is substantially same as that of the belt part in the three-nine o'clock direction.

6. The watch according to claim 1, further comprising:

a lower guard part that is positioned along a lower edge of the display.

7. The watch according to claim 6, wherein a length of the lower guard part in a three-nine o'clock direction is shorter than that of the display in the three-nine o'clock direction.

8. The watch according to claim 6, wherein a length of the lower guard part in a three nine o'clock direction is substantially same as that of the belt part in the three-nine o'clock direction.

9. The watch according to claim 6, wherein the first one and the second one of the at least two buttons are positioned along a lower side of the lower guard part.

10. The watch according to claim 9, further comprising a longitudinal guard part, which extends between the first one and the second one of the at least two buttons in a direction that crosses the lower guard part.

11. The watch according to claim 10, wherein the longitudinal guard part is inclined counterclockwise from a twelve-six o'clock direction.

12. The watch according to claim 1, wherein a length of the first one of the at least two buttons along a lower edge of the display is longer than that of the second one of the at least two buttons along the lower edge of the display.

13. The watch according to claim 1, wherein a length of an upper side of the first one of the at least two buttons along a lower edge of the display is longer than that of a lower side of the first one of the at least two buttons along the lower edge of the display.

14. The watch according to claim 1, wherein a length of the first one of the at least two buttons in a twelve-six o'clock direction is substantially same as that of the another second one of the at least two buttons in the twelve-six o'clock direction.

15. The watch according to claim 1, wherein the first one of the at least two buttons is disposed on a rightmost side among the at least two buttons.

* * * * *